(12) United States Patent
Nguyen

(10) Patent No.: US 9,429,005 B2
(45) Date of Patent: Aug. 30, 2016

(54) METHODS FOR HINDERING THE SETTLING OF PROPPANT IN A SUBTERRANEAN FORMATION

(71) Applicant: Halliburton Energy Services, Inc., Houston, TX (US)

(72) Inventor: Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/687,406

(22) Filed: Nov. 28, 2012

(65) Prior Publication Data

US 2014/0144629 A1 May 29, 2014

(51) Int. Cl.
*E21B 43/267* (2006.01)
*C09K 8/80* (2006.01)

(52) U.S. Cl.
CPC .............. *E21B 43/267* (2013.01); *C09K 8/805* (2013.01)

(58) Field of Classification Search
CPC ............................. C09K 8/805; E21B 43/267
USPC ......... 166/239, 276, 278, 279, 280.1, 280.2, 166/292, 293, 295, 369, 309; 507/204
See application file for complete search history.

(56) References Cited

U.S. PATENT DOCUMENTS

| | | | |
|---|---|---|---|
| 3,980,136 A * | 9/1976 | Plummer et al. ........... | 166/280.1 |
| 4,585,064 A | 4/1986 | Graham et al. | |
| 4,670,501 A | 6/1987 | Dymond et al. | |
| 5,249,627 A | 10/1993 | Harms et al. | |
| 5,439,059 A | 8/1995 | Harris et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,905,061 A | 5/1999 | Patel | |
| 5,977,031 A | 11/1999 | Patel | |
| 6,209,643 B1 * | 4/2001 | Nguyen et al. ............... | 166/276 |
| 6,311,773 B1 | 11/2001 | Todd et al. | |
| 6,439,309 B1 | 8/2002 | Matherly et al. | |
| 6,488,091 B1 | 12/2002 | Weaver et al. | |
| 6,582,819 B2 | 6/2003 | McDaniel et al. | |
| 6,677,426 B2 | 1/2004 | Noro et al. | |
| 6,828,279 B2 | 12/2004 | Patel et al. | |
| 6,992,048 B2 * | 1/2006 | Reddy et al. ................. | 507/202 |
| 7,131,491 B2 | 11/2006 | Blauch et al. | |
| 7,153,575 B2 | 12/2006 | Anderson et al. | |
| 7,199,083 B2 | 4/2007 | Zevallos | |
| 7,211,546 B2 | 5/2007 | Dobson, Jr. et al. | |
| 7,216,705 B2 * | 5/2007 | Saini et al. .................... | 166/279 |
| 7,261,156 B2 * | 8/2007 | Nguyen et al. ............... | 166/276 |
| 7,350,579 B2 | 4/2008 | Gatlin et al. | |
| 7,392,847 B2 | 7/2008 | Gatlin et al. | |
| 7,407,010 B2 * | 8/2008 | Rickman et al. ............. | 166/295 |
| 7,534,745 B2 | 5/2009 | Taylor et al. | |
| 7,581,590 B2 * | 9/2009 | Lesko et al. ................ | 166/280.1 |
| 7,595,391 B2 | 9/2009 | Norman et al. | |
| 7,645,723 B2 | 1/2010 | Kirsner et al. | |
| 7,673,686 B2 | 3/2010 | Nguyen et al. | |
| 7,696,131 B2 | 4/2010 | Oyler et al. | |
| 7,900,702 B2 * | 3/2011 | Reddy et al. ................. | 166/276 |
| 7,956,017 B2 | 6/2011 | Gatlin et al. | |
| 8,076,271 B2 | 12/2011 | Blauch et al. | |
| 8,448,706 B2 * | 5/2013 | Hughes et al. .............. | 166/280.2 |
| 2003/0221831 A1 * | 12/2003 | Reddy et al. ................. | 166/293 |
| 2005/0126781 A1 * | 6/2005 | Reddy et al. ................. | 166/292 |
| 2007/0034378 A1 | 2/2007 | Welton et al. | |
| 2008/0006405 A1 | 1/2008 | Rickman et al. | |
| 2009/0275488 A1 * | 11/2009 | Zamora et al. ............... | 507/204 |
| 2009/0298720 A1 | 12/2009 | Nguyen et al. | |
| 2010/0179281 A1 | 7/2010 | Nilsen | |
| 2010/0212898 A1 | 8/2010 | Nguyen et al. | |
| 2010/0252262 A1 * | 10/2010 | Ekstrand et al. ........... | 166/280.1 |
| 2010/0280210 A1 | 11/2010 | Kitamura et al. | |
| 2011/0098394 A1 | 4/2011 | Schmeltzer et al. | |
| 2012/0227967 A1 * | 9/2012 | Shaikh et al. .............. | 166/280.1 |
| 2013/0068469 A1 * | 3/2013 | Lin et al. ...................... | 166/369 |
| 2014/0131042 A1 | 5/2014 | Nguyen et al. | |
| 2014/0144639 A1 | 5/2014 | Nguyen et al. | |

* cited by examiner

*Primary Examiner* — Angela M DiTrani
*Assistant Examiner* — Avi Skaist
(74) *Attorney, Agent, or Firm* — McDermott Will & Emery LLP; Craig Roddy

(57) ABSTRACT

Methods of treating a subterranean formation including providing a subterranean formation comprising at least one fracture; providing proppant particulates coated with a binding agent and having a gas-generating chemical and a delayed encapsulated activator attached thereto so as to form coated proppant particulates; suspending the coated proppant particulates in a treatment fluid; placing the treatment fluid into the at least one fracture; and reacting the gas-generating chemical and the delayed encapsulated activator so as to produce a gas within the at least one fracture and form a proppant pack therein.

18 Claims, No Drawings

METHODS FOR HINDERING THE SETTLING OF PROPPANT IN A SUBTERRANEAN FORMATION

BACKGROUND

The present invention relates to methods for hindering the settling of proppant in a subterranean formation. More particularly, the present invention relates to methods of treating subterranean formations with treatment fluids comprising proppant particulate and/or proppant aggregate gas generated suspension aids.

Subterranean wells (e.g., hydrocarbon producing wells, water producing wells, and injection wells) are often stimulated by hydraulic fracturing treatments. In a typical hydraulic fracturing treatment, a treatment fluid is pumped into a wellbore in a subterranean formation at a rate and pressure above the fracture gradient of the particular subterranean formation so as to create or enhance at least one fracture therein. Particulate solids (e.g., graded sand, bauxite, ceramic, nut hulls, and the like), or "proppant particulates," are typically suspended in the treatment fluid or a second treatment fluid and deposited into the fractures while maintaining pressure above the fracture gradient. The proppant particulates are generally deposited in the fracture in a concentration sufficient to form a tight pack of proppant particulates, or "proppant pack," which serves to prevent the fracture from fully closing once the hydraulic pressure is removed. By keeping the fracture from fully closing, the interstitial spaces between individual proppant particulates in the proppant pack form conductive pathways through which produced fluids may flow.

A known alternative hydraulic fracturing treatment involves placing a much reduced volume of proppant in a fracture to create a conductive fracture. In such treatments, individual proppant particulates are formed into proppant aggregates. As used herein, the term "proppant aggregate" refers to a coherent body of any proppant particulates, such that the proppant aggregate does not generally become dispersed into smaller bodies without the application of shear. The proppant aggregates may be placed into the fracture in a more spaced apart fashion than individual proppant particulates, so as to form proppant pillars capable of maintaining sufficient integrity to hold open the fracture once the hydraulic pressure is removed and allow for the flow of produced fluids.

In traditional hydraulic fracturing treatments, the specific gravity of the proppant particulates and proppant aggregates may be high in relation to the treatment fluids in which they are suspended for transport and deposit in a fracture. Therefore, the proppant particulates and aggregates may settle toward the bottommost portion of the fracture. For example, where the bottom of a fracture contains uneven surface, as is often the case, the proppant particulates or aggregates may accumulate only or substantially at the bottommost portion of the uneven surface of the fracture. The settling nature of proppant particulates and aggregates in traditional hydraulic fracturing treatments can result in complete or partial occlusion of the portion of the fracture where no proppant particulates or proppant aggregates have collected when the hydraulic pressure is removed (e.g., at the top of the fracture or a bottom portion of the fracture above a bottommost portion). As such, fracture conductivity and production over the life of a subterranean well may be substantially impaired.

One way to compensate for proppant particulate and proppant aggregate settling is to introduce the proppant particulates or aggregates into the fracture in a viscous gelled fluid. Gelled fluids typically require high concentrations of gelling agents and/or crosslinker, particularly when transporting high concentrations of proppant particulates or aggregates in order to maintain them in suspension. As many gelling and crosslinking agents are used in a variety of fluids within and outside of the oil and gas industry, their demand is increasing while their supply is decreasing. Therefore, the cost of gelling and crosslinking agents is increasing, and consequently, the cost of hydraulic fracturing treatments requiring them is also increasing.

Another method of compensating for the settling nature of proppant particulates and aggregates is the introduction of gas-generating mechanisms that introduce sufficient gas to increase proppant particulate or aggregate buoyancy within the treatment fluid. However, the gas is often generated at unwanted intervals within the subterranean formation (e.g., prior to the proppant particulates or aggregates reaching the fracture). Additionally, gas may be generated partially at unwanted intervals and partially at the desired interval, such that the amount of gas generated at the desired interval is insufficient to increase the buoyancy of the proppant particulates or aggregates to overcome settling forces.

The degree of success of a hydraulic fracturing operation depends, at least in part, upon fracture conductivity after the fracturing operation has ceased and production commenced. Therefore, a method of hindering the settling of proppant particulates and/or proppant aggregates suspended in a treatment fluid in order to prevent partial or complete fracture closure may be of value to one of ordinary skill in the art.

SUMMARY OF THE INVENTION

The present invention relates to methods for hindering the settling of proppant in a subterranean formation.

In one embodiment, the present invention provides a method comprising: providing a subterranean formation comprising at least one fracture; providing proppant particulates coated with a binding agent and having a gas-generating chemical and a delayed encapsulated activator attached thereto so as to form coated proppant particulates; suspending the coated proppant particulates in a treatment fluid; placing the treatment fluid into the at least one fracture; and reacting the gas-generating chemical and the delayed encapsulated activator so as to produce a gas within the at least one fracture and form a proppant pack therein.

In other embodiments, the present invention provides a method comprising: providing a subterranean formation comprising at least one fracture; providing proppant aggregates coated with a binding agent and having a gas-generating chemical and a delayed encapsulated activator attached thereto so as to form coated proppant aggregates; suspending the coated proppant aggregates in a treatment fluid; placing the treatment fluid into the at least one fracture; and reacting the gas-generating chemical and the delayed encapsulated activator so as to produce a gas within the at least one fracture and form a proppant pillar therein.

In still other embodiments, the present invention provides a method comprising: providing a subterranean formation comprising at least one fracture; providing a proppant mixture comprising proppant particulates, a gas-generating chemical, and a delayed encapsulated activator; suspending the proppant mixture in a treatment fluid comprising a binding agent; coating the proppant particulates with the binding agent such that the gas-generating chemical and the delayed encapsulated activator attach thereto so as to form coated proppant particulates or coated proppant aggregates; placing the treatment fluid comprising the coated proppant particulates or coated proppant aggregates into the at least one fracture; and reacting the gas-generating chemical and the delayed encapsulated activator so as to produce a gas within the at least one fracture and form a proppant pack or a proppant pillar therein.

The features and advantages of the present invention will be readily apparent to those skilled in the art upon a reading of the description of the preferred embodiments that follows.

DETAILED DESCRIPTION

The present invention relates to methods for hindering the settling of proppant in a subterranean formation.

The methods described herein hinder the settling of proppant particulates and/or aggregates by employing an in situ gas-generating mechanism that generates gas at the exact point of need. Particularly, the methods of the present invention provide for a gas-generating mechanism that is adhered onto individual proppant particulates or proppant aggregates so as to ensure that the gas is generated upon encountering a known activation trigger at a known interval in the subterranean formation and will act specifically upon the proppant particulate or aggregate. As used herein, the term "gas-generating mechanism" refers to any agent or combination of agents capable of adhering onto a proppant particulate or aggregate and generating gas in a treatment fluid used in a subterranean operation (e.g., a gas-generating chemical and a delayed encapsulated activator).

In some embodiments, the present invention provides a method of treating a subterranean formation having at least one fracture by placing into the at least one fracture a treatment fluid comprising suspended proppant particulates coated with a binding agent and having a gas-generating chemical and a delayed encapsulated activator attached thereto. The adhered gas-generating chemical and delayed encapsulated activator are then reacted together in order to produce a gas within the at least one fracture and to form a proppant pack therein. In other embodiments, the present invention provides a method of treating a subterranean formation having at least one fracture by placing into the at least one fracture a treatment fluid comprising suspended proppant aggregates coated with a binding agent and having a gas-generating chemical and a delayed encapsulated activator attached thereto. The adhered gas-generating chemical and delayed encapsulated activator are then reacted together in order to produce a gas within the at least one fracture and to form a proppant pillar therein.

Where proppant aggregates are formed for use in the present invention, they may be formed by any means known to adhere individual proppant particulates together such that they form a coherent body that does not generally disperse with out the application of shear. In some embodiments, the proppant aggregates suitable for use in the present invention are formed by mixing proppant particulates with any of the binding agents disclosed herein so as to form coherent masses.

In other embodiments, the methods of the present invention comprise first providing a proppant mixture comprising proppant particulates, a gas-generating chemical, and a delayed encapsulated activator. The proppant mixture is suspended in a treatment fluid comprising a binding agent such that the binding agent coats the proppant particulates so as to form coated proppant particulates or coated proppant aggregates and the gas-generating chemical and the delayed encapsulated activator is attached thereto. The treatment fluid is then placed into a fracture in a subterranean formation such that adhered gas-generating chemical and delayed encapsulated activator react together in order to produce a gas within the fracture and to form a proppant pack or a proppant pillar therein. One of ordinary skill in the art, with the benefit of this disclosure, will recognize whether a particular application would benefit from first pre-mixing a proppant mixture comprising the proppant particulate, gas-generating chemical, and delayed encapsulated activator prior to introducing the proppant mixture into a treatment fluid comprising a binding agent, or whether the binding agent should first be coated onto the proppant particulates and/or proppant aggregate and the gas-generating chemical and delayed encapsulated activator adhered thereto prior to introducing the coated proppant particulates into a treatment fluid. Such a determination may depend on a number of factors including, for example, the type and/or concentration of treatment fluid, proppant particulates, binding agent, gas-generating chemical, and/or delayed encapsulated activator used, as well as the type and conditions of the subterranean formation being treated.

The treatment fluids for use in the present invention may include any treatment fluids suitable for use in a subterranean formation, provided that they do not interfere with the operation of the gas-generating mechanism of the present invention. Suitable treatment fluids for use in conjunction with the present invention may include, but are not limited to, oil-based fluids, aqueous-based fluids, aqueous-miscible fluids, water-in-oil emulsions, or oil-in-water emulsions. Suitable oil-based fluids may include alkanes; olefins; aromatic organic compounds; cyclic alkanes; paraffins; diesel fluids; mineral oils; desulfurized hydrogenated kerosenes; and any combination thereof. Suitable aqueous-based fluids may include fresh water; saltwater (e.g., water containing one or more salts dissolved therein); brine (e.g., saturated salt water); seawater; and any combination thereof. Suitable aqueous-miscible fluids may include, but not be limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivatives thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combinations thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997, U.S. Pat. No. 5,977,031 entitled "Ester Based Invert Emulsion Drilling Fluids and Muds Having Negative Alkalinity" filed on Aug. 8, 1998, U.S. Pat. No. 6,828,279 entitled "Biodegradable Surfactant for Invert Emulsion Drilling Fluid" filed on Aug. 10, 2001, U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, U.S. Pat. No. 7,645,723 entitled "Method of Drilling Using Invert Emulsion Drilling Fluids" filed on Aug. 15, 2007, and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

In some embodiments, the treatment fluids used in conjunction with the methods of the present invention may be gelled. Gelling the treatment fluid may synergistically operate with the gas-generating mechanism of the present invention because the viscous gelled treatment fluid may provide improved suspension of the proppant particulates or aggregates, while the gas-generating mechanism further increases the buoyancy of the proppant particulates or aggregates within the treatment fluid. Moreover, a gelled treatment fluid may reduce fluid loss in the subterranean formation. The viscosity of the treatment fluid would not need to be increased as would be necessary if no gas-generating mechanism were present. Therefore, a much-reduced concentration of gelling agent and/or crosslinking agent could be used in the methods of the present invention compared to traditional fracturing methods.

The treatment fluids of the present invention may be gelled by including a gelling agent and, optionally, a crosslinking agent. A variety of gelling agents may be used, including hydratable polymers that contain one or more functional groups such as hydroxyl, carboxyl, sulfate, sulfonate, amino, or amide groups. Suitable gelling agents typically comprise polymers; synthetic polymers; and any combinations thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units including, but not limited to, galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, carboxymethyl guar and cellulose derivatives, such as carboxylemthyl cellulose, hydroxyethyl cellulose. Additionally, synthetic polymers and copolymers that contain the above-mentioned functional groups may be used. Examples of such synthetic polymers include, but are not limited to, polyacrylate; polymethacrylate; polyacrylamide; polyvinyl alcohol; polyvinylpyrrolidone; and any combinations thereof. In other embodiments, the gelling agent molecule may be depolymerized. As used herein, the term "depolymerized," generally refers to a decrease in the molecular weight of the gelling agent molecule. Depolymerized gelling agent molecules are described in U.S. Pat. No. 6,488,091 issued to Weaver, et al., the entire disclosure of which is incorporated herein by reference. Suitable gelling agents generally are present in the viscosified treatment fluids of the present invention in an amount in the range of from about 0.1% to about 5% by weight of the treatment fluid alone. In preferred embodiments, the gelling agents are present in the treatment fluids of the present invention in an amount in the range of from about 0.01% to about 1% by weight of the treatment fluid alone.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid; disodium octaborate tetrahydrate; sodium diborate; pentaborates; ulexite and colemanite; compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate); compounds that can supply titanium IV ions (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; and any combinations thereof. An example of a suitable commercially available zirconium-based crosslinker is CL-24™ available from Halliburton Energy Services, Inc. of Houston, Tex. An example of a suitable commercially available titanium-based crosslinker is CL-39™ available from Halliburton Energy Services, Inc. of Houston, Tex. Suitable crosslinkers generally are present in the treatment fluids of the present invention in an amount sufficient to provide, in situ, the desired degree of crosslinking between gelling agent molecules. In certain embodiments of the present invention, the crosslinkers may be present in an amount in the range from about 0.001% to about 10% by weight of the treatment fluid alone. In other embodiments of the present invention, the crosslinkers may be present in the treatment fluids of the present invention in an amount in the range from about 0.01% to about 1% by weight of the treatment fluid alone. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids for use in conjunction with the methods of the present invention may additionally include internal delayed gel breakers such as enzyme, oxidizing, acid buffer, or temperature-activated gel breakers. The gel breakers cause the treatment fluids to revert to thin fluids that can be produced back to the surface after they have been used to place the proppant particulates or aggregates in subterranean fractures. The gel breaker used is typically present in the treatment fluid in an amount in the range of from about 0.01% to about 10% by weight of the gelling agent.

The treatment fluids of the present invention may additionally comprise any additive suitable for use in subterranean operations provided that it does not interfere with the gas-generating mechanism of the present invention. Suitable additives include, but are not limited to, a salt; a weighting agent; an inert solid; a fluid loss control agent; an emulsifier; a dispersion aid; a corrosion inhibitor; emulsion thinner; an emulsion thickener; a surfactant; a lost circulation material; a foaming agent; a pH control additive; a biocide; a stabilizer; a chelating agent; a scale inhibitor; a mutual solvent; an oxidizer; a reducer; a friction reducer; a foaming agent; a clay stabilizing agent; and any combinations thereof.

Proppant particulates suitable for use in the methods of the present invention may be of any size and shape combination known in the art as suitable for use in a fracturing operation. Generally, where the chosen proppant particulate is substantially spherical, suitable proppant particulates have a size in the range of from about 2 to about 400 mesh, U.S. Sieve Series. In some embodiments of the present invention, the proppant particulates have a size in the range of from about 8 to about 180 mesh, U.S. Sieve Series. A major advantage of using this method is there is no need for the solid particulates to be sieved or screened to a particular or specific particle mesh size or particular particle size distribution, but rather a wide or broad particle size distribution may be used.

In some embodiments of the present invention, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be preferred in some embodiments of the present invention because, among other things, they may provide a lower rate of settling in treatment fluids, which may act synergistically with the gas-generating mechanism of the present invention.

Proppant particulates suitable for use in the present invention may comprise any material suitable for use in subterranean operations. Suitable materials include, but are not limited to, sand (e.g., beach sand, desert sand, or graded sand); bauxite; ceramic materials; glass materials (e.g., crushed, disposal glass material); polymer materials (e.g., EVA or composite materials); polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; lightweight particulates; microsphere plastic beads; ceramic microspheres; glass microspheres; manmade fibers; cements (e.g., Portland cements); fly ash; carbon black powder; and any combinations thereof. Suitable composite particulates may comprise a binding agent and a filler material wherein suitable filler materials include silica; alumina; fumed carbon; carbon black; graphite; mica; titanium dioxide; barite; meta-silicate; calcium silicate; kaolin; talc; zirconia; boron; fly ash; hollow glass microspheres; solid glass; and combinations thereof.

In some embodiments of the present invention, degradable particulates are included in the treatment fluids so as to be intermixed within the formed proppant packs or proppant pillars of the present invention. One purpose of including degradable particulates is to enhance the permeability of the conductivity of the fracture by increasing the interstitial spaces between individual proppant particulates in proppant packs and within proppant aggregates. In some embodiments, the degradable particles used are oil-degradable materials, which degrade by produced fluids. In other embodiments, the degradable particulates may be degraded by materials purposely placed in the formation by injection or mixing the degradable particle with delayed reaction degradation agents, or other suitable means to induce degradation. In embodiments in which degradable particulates are used, the degradable particulates are preferably substantially uniformly distributed throughout the proppant packs or proppant pillars. Over time, the degradable material will degrade, in situ, causing the degradable material to substantially be removed from the proppant packs and proppant pillars of the present invention and to leave behind voids. These voids may enhance the conductivity of the fracture.

Suitable degradable particulates include oil-degradable polymers. Oil-degradable polymers that may be used in accordance with the present invention may be either natural or synthetic polymers. Some particular examples include, but are not limited to, a polyacrylic; a polyamide; a polyolefin (e.g., polyethylene, polypropylene, polyisobutylene, and polystyrene); and combinations thereof. Other suitable oil-degradable polymers include those that have a melting point which is such that the polymer will melt or dissolve at the temperature of the subterranean formation in which it is placed, such as a wax material.

In addition to oil-degradable polymers, other degradable particulates that may be used in conjunction with the present invention include, but are not limited to, a degradable polymer; a dehydrated salt; and/or mixtures of the two. As for degradable polymers, a polymer is considered to be "degradable" herein if the degradation is due to, in situ, a chemical and/or radical process such as hydrolysis or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent on, at least, the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., formation temperature, presence of moisture, oxygen, microorganisms, enzymes, pH, and the like).

Suitable examples of degradable polymers that may be used in accordance with the present invention include a polysaccharide (e.g., dextran or cellulose); a chitin; a chitosan; a protein; an aliphatic polyester; a poly(lactide); a poly(glycolide); a poly($\epsilon$-caprolactone); a poly(hydroxybutyrate); a poly(anhydride); an aliphatic polycarbonate; an aromatic polycarbonate; a poly(orthoester); a poly(amino acid); a poly(ethylene oxide); a polyphosphazenes; and any combinations thereof. Of these suitable polymers, aliphatic polyesters and polyanhydrides may be preferred. Polyanhydride hydrolysis proceeds, in situ, via free carboxylic acid chain-ends to yield carboxylic acids as final degradation products. The degradation time can be varied over a broad range by changes in the polymer backbone. Examples of suitable polyanhydrides include, but are not limited to, a poly(adipic anhydride); a poly(suberic anhydride); a poly (sebacic anhydride); and a poly(dodecanedioic anhydride). Other suitable examples include, but are not limited to, a poly(maleic anhydride) and a poly(benzoic anhydride).

Dehydrated salts may be used in accordance with the present invention as a degradable particulate. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, an anhydrous sodium tetraborate (also known as anhydrous borax) and an anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous-based treatment fluids of the present invention. In some instances, the total time required for the anhydrous borate materials to degrade in an aqueous-based treatment fluid is in the range of from about 8 hours to about 72 hours depending upon the temperature of the subterranean zone in which they are placed. Other examples include organic or inorganic salts like acetate trihydrate.

Blends of certain degradable materials may also be suitable as degradable particulates. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with the gas-generating mechanism of the present invention, the conductivity of the proppant packs or proppant pillars of the present invention, or with the production of any of the fluids from the subterranean formation.

In some embodiments of the present invention, the degradable particulates are present in the range from about 1% to about 40% by weight of the total proppant particulates introduced into a treatment fluid as either individual particulates or to form proppant aggregates. In other embodiments, the degradable particulates are present in the range from about 5% to about 20% by weight of the total proppant particulates introduced into a treatment fluid as either individual particulates or to form proppant aggregates. One of ordinary skill in the art with the benefit of this disclosure will recognize an optimum concentration of degradable particulates that provides desirable values in terms of enhanced conductivity or permeability without undermining the stability of the propped fracture itself.

Any binding agent suitable for use in a subterranean formation may be used in the methods of the present invention provided. The binding agents used in the present invention exhibit a sticky or tacky character. As used herein, the term "tacky," in all of its forms, generally refers to a substance having a nature such that it is (or may be activated to become) somewhat sticky to the touch. Among other things, the binding agent is used to coat proppant particulates and/or proppant aggregates so as to form a tacky exterior surrounding the proppant particulates or aggregates such that the gas-generating chemical and the delayed encapsulated activator of the present invention may attach thereto. Additionally, the binding agent may be used to form proppant aggregates from individual proppant particulates, preventing their dispersion when introduced downhole.

Suitable binding agents for use in the present invention include, but are not limited to, non-aqueous tackifying agents; aqueous tackifying agents; silyl-modified polyamide compounds; zeta-potential modifying agents; curable resins; silicon-based resins; and any combination thereof. The type and amount of binding agent included in a particular method of the present invention may depend upon, among other factors, the type and size of proppant particulate used, the composition and/or temperature of the subterranean formation, the chemical composition of treatment fluid, the flow rate of fluid present in the formation, the effective porosity and/or permeability of the subterranean formation, pore throat size and distribution, and the like. The concentration of the binding agent can be varied, inter alia, to either enhance bridging to provide for a more rapid coating of the binding fluid (e.g., onto the proppant particulates or aggregates) or to minimize bridging to allow deeper penetration into the subterranean formation. It is within the ability of one skilled in the art, with the benefit of this disclosure, to determine the type and amount of binding fluid to include in the methods of the present invention to achieve the desired results.

Nonlimiting examples of suitable non-aqueous tackifying agents may be found in U.S. Pat. Nos. 7,392,847; 7,350,579; 5,853,048; 5,839,510; and 5,833,000, the entire disclosures of which are herein incorporated by reference. Nonlimiting examples of suitable aqueous tackifying agents may be found in U.S. Pat. Nos. 8,076,271; 7,131,491; 5,249,627; and 4,670,501, the entire disclosures of which are herein incorporated by reference. Nonlimiting examples of suitable silyl-modified polyamide compounds may be found in U.S. Pat. No. 6,439,309, the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication Nos. 2010/0212898 and 2008/0006405, the entire disclosures of which are herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0280210, 2010/0179281, and 2010/0212898 the entire disclosures of which are herein incorporated by reference. In some embodiments of the present invention, the binding agent is present in an amount from about 0.01% to about 10% by weight of the proppant particulate. In preferred embodiments of the present invention, the binding agent is present in an amount from about 1% to about 5% by weight of the proppant particulate. It is within the ability of one skilled in the art, with the benefit of this disclosure, to determine the type and amount of binding agent to include in the methods of the present invention to achieve the desired results.

The gas-generating chemical for use in conjunction with the methods of the present invention may be any chemical capable of producing gas in a subterranean formation when reacted with an activator (e.g., the delayed encapsulated activator of the present invention). The gas-generating chemical may preferably generate nitrogen and ammonia, wherein a greater amount of nitrogen is generated than ammonia. When a gas-generating chemical is selected that contains an amide group, nitrogen is produced with lesser amounts of ammonia, carbon dioxide, and carbon monoxide may be produced. In other embodiments, the gas-generating chemical may generate carbon dioxide.

Suitable nitrogen producing gas-generating chemicals for use in the present invention include, but are not limited to, an azo-based compound; a hydrazide-based compound; and any combinations thereof. Examples of suitable azo-based and hydrazide-based compounds include, but are not limited to, hydrazine; azodicarbonamide; azobis (isobutyronitrile); p toluene sulfonyl hydrazide; p-toluene sulfonyl semicarbazide; carbonhydrazide; and p-p' oxybis (benzenesulfonylhydrazide). Of these, azodicarbonamide and carbonhydrazide are preferred. Nitrogen producing gas-generating chemicals that do not contain an azo-based or a hydrazide-based compound may also be used in the methods of the present invention including, but not limited to, ammonium salts of organic acids; ammonium salts of inorganic acids; hydroxylamine sulfate; carbamide; and any combinations thereof. Suitable carbon dioxide producing gas-generating chemicals may include, but are not limited to, an acidic salt of an alkali metal; a neutral salt of an alkali metal; an acidic salt of an alkaline earth metal; a neutral salt of an alkaline earth metal; organic acids; inorganic acids; and any combinations thereof.

In some embodiments, the gas-generating chemical may be present such that the treatment fluid exhibits a gas quality in the range from a lower limit of about 5%, 10%, 25%, 40%, 50%, 60%, or 70% to an upper limit of about 95%, 90%, 80%, 75%, 60%, or 50% gas volume, and wherein the gas quality of the treatment fluid may range from any lower limit to any upper limit and encompass any subset therebetween. Most preferably, the treatment fluid may have a gas quality from about 60% to about 95%, or about 70% to about 95%. Typically, the gas-generating chemical is present in an amount from about 75% to about 85% by volume of the treatment fluid.

The delayed encapsulated activators of the present invention comprise an activator and an encapsulating material. The delayed encapsulated activators are capable of causing, or "activating," the gas-generating chemical so as to generate gas upon encountering a particular stimuli, such as, for example, temperature, pH, salinity, and/or the passage of time. In some instances, a delayed encapsulated activator may be capable of activating the gas-generating chemical upon encountering multiple stimuli. In order to ensure that the activator activates the gas-generating chemical at a desired interval within a subterranean formation (e.g., a fracture) and are not "spent," such that all of the gas generation occurs prior to the placement of the proppant particulates or aggregates at the desired interval, it encapsulated so as to for the delayed encapsulated activators of the present invention and delay the reaction with the gas-generating chemical is delayed. In some embodiments, the delayed encapsulated activators for use in the methods of the present invention may be present in a range from about 0.01% to about 25% by weight of the gas-generating chemical. In preferred embodiments, the delayed encapsulated activators for use in the methods of the present invention may be present in a range from about 1% to about 10% by weight of the gas-generating chemical.

Suitable activators for use in the delayed encapsulated activators of the present invention include, but are not limited to, an alkali metal-containing material; an alkaline earth metal-containing compound; and any combinations thereof. Examples of suitable alkali metal- and alkaline metal-containing activators include, but are not limited to, carbonate; hydroxide; lithium salt; sodium salt; persulfate; perborate; hypochlorite; hypobromite; chlorite; chlorate; iodate; bromate; chloroaurate; arsenate; antimonite; molybate anion. Oxidizing agents of alkali metal- and alkaline metal-containing materials may include, but are not limited to, ammonium persulfate; sodium persulfate; potassium persulfate; sodium chlorate; sodium chlorate; hydrogen peroxide; sodium perborate; and sodium peroxy carbonate.

The delayed encapsulated activators may be encapsulated by any method known in the art such that the reaction between the activator encapsulated and the gas-generating chemical of the present invention is delayed. In some embodiments, the encapsulating material may be coated onto the activator to form the delayed encapsulated activators of the present invention by mixing, spray coating, or any other method. Suitable encapsulating material for use in preparing the delayed encapsulated activators of the present invention include, but are not limited to, a wax; a drying oil (e.g., tung oil, linseed oil, and the like); a polyurethane; a cross-linked partially hydrolyzed polyacrylic; and any combinations thereof. By way of example, a wax encapsulation may release in the presence of sufficient temperature to melt the wax coating Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing coated proppant particulates comprising proppant particulates wherein the proppant particulates are coated with a binding agent,
wherein the binding agent adheres a gas-generating chemical and a delayed encapsulated activator to the particulates, and
wherein the delayed encapsulated activator comprises an activator surrounded by an encapsulating material;
suspending the coated proppant particulates having the gas-generating chemical and the delayed encapsulated activator adhered thereto in a treatment fluid;
placing the treatment fluid into at least one fracture in a subterranean formation;
releasing the activator from its encapsulation within the at least one fracture; and
reacting the adhered gas-generating chemical with the released activator so as to produce a gas within the at least one fracture and form a proppant pack therein, the reacting occurring while the gas-generating chemical is still adhered to the binding agent on the coated proppant particulates,
wherein the gas acts specifically upon the coated proppant particulates.

2. The method of claim 1, wherein the binding agent is selected from the group consisting of a non-aqueous tackifying agent; an aqueous tackifying agent; a silyl-modified polyamide compound; a zeta-potential modifying agent; a curable resin; a silicon-based resin; and any combination thereof.

3. The method of claim 1, wherein the gas is selected from the group consisting of nitrogen; ammonia; carbon dioxide; carbon monoxide; or any combination thereof.

4. The method of claim 1, wherein the gas-generating chemical is selected from the group consisting of an azo-based compound; a hydrazide-based compound; or any combination thereof.

5. The method of claim 1, wherein the activator is selected from the group consisting of an alkali metal-containing material; an alkaline earth metal-containing compound; or any combination thereof.

6. The method of claim 1, wherein the encapsulating material is selected from the group consisting of a wax; a drying oil; a polyurethane; a cross-linked partially hydrolyzed polyacrylic; and any combination thereof.

7. A method comprising:
providing coated proppant aggregates comprising proppant aggregates wherein the proppant aggregates are coated with a binding agent,
wherein the binding agent adheres a gas-generating chemical and a delayed encapsulated activator to the aggregates, and
wherein the delayed encapsulated activator comprises an activator surrounded by an encapsulating material;
suspending the coated proppant aggregates having the gas-generating chemical and the delayed encapsulated activator adhered thereto in a treatment fluid;
placing the treatment fluid into at least one fracture in a subterranean formation;
releasing the activator from its encapsulation within the at least one fracture; and
reacting the adhered gas-generating chemical with the released activator so as to produce a gas within the at least one fracture and form a proppant pillar therein, the reacting occurring while the gas-generating chemical is still adhered to the binding agent on the coated proppant aggregates,
wherein the gas acts specifically upon the coated proppant aggregates.

8. The method of claim 7, wherein the binding agent is selected from the group consisting of a non-aqueous tackifying agent; an aqueous tackifying agent; a silyl-modified polyamide compound; a zeta-potential modifying agent; a curable resin; a silicon-based resin; and any combination thereof.

9. The method of claim 7, wherein the gas is selected from the group consisting of nitrogen; ammonia; carbon dioxide; carbon monoxide; or any combination thereof.

10. The method of claim 7, wherein the gas-generating chemical is selected from the group consisting of an azo-based compound; a hydrazide-based compound; or any combination thereof.

11. The method of claim 7, wherein the encapsulating material is selected from the group consisting of a wax; a drying oil; a polyurethane; a cross-linked partially hydrolyzed polyacrylic; and any combination thereof.

12. The method of claim 7, wherein the activator is selected from the group consisting of an alkali metal-containing material; an alkaline earth metal-containing compound; or any combination thereof.

13. A method comprising:
providing a proppant mixture comprising proppant particulates, a gas-generating chemical, and a delayed encapsulated activator;
wherein the delayed encapsulated activator comprises an activator surrounded by an encapsulating material;
suspending the proppant mixture in a treatment fluid comprising a binding agent;
coating the proppant particulates with the binding agent, thereby forming coated proppant particulates,
wherein the binding agent adheres the gas-generating chemical and the delayed encapsulated activator to the coated proppant particulates;
placing the treatment fluid comprising the coated proppant particulates having the gas-generating chemical and the delayed encapsulated activator adhered thereto into at least one fracture in a subterranean formation;
releasing the activator from its encapsulation within the at least one fracture; and
reacting the adhered gas-generating chemical with the released activator so as to produce a gas within the at least one fracture and form a proppant pack therein, the reacting occurring while the gas-generating chemical is still adhered to the binding agent on the coated proppant particulates,
wherein the gas acts specifically upon the coated proppant particulates.

14. The method of claim 13, wherein the binding agent is selected from the group consisting of a non-aqueous tackifying agent; an aqueous tackifying agent; a silyl-modified polyamide compound; a zeta-potential modifying agent; a curable resin; a silicon-based resin; and any combination thereof.

15. The method of claim 13, wherein the gas is selected from the group consisting of nitrogen; ammonia; carbon dioxide; carbon monoxide; or any combination thereof.

16. The method of claim 13, wherein the gas-generating chemical is selected from the group consisting of an azo-based compound; a hydrazide-based compound; or any combination thereof.

17. The method of claim 13, wherein the activator is selected from the group consisting of an alkali metal-containing material; an alkaline earth metal-containing compound; or any combination thereof.

18. The method of claim 13, wherein the encapsulating material is selected from the group consisting of a wax; a drying oil; a polyurethane; a cross-linked partially hydrolyzed polyacrylic; and any combination thereof.

* * * * *